Sept. 10, 1968 R. W. BOLVIN 3,401,338
TESTER FOR SEMICONDUCTOR DEVICES HAVING A ZENER DIODE CONTROLLED BIAS REMOVAL PROTECTION CIRCUIT
Filed April 11, 1966
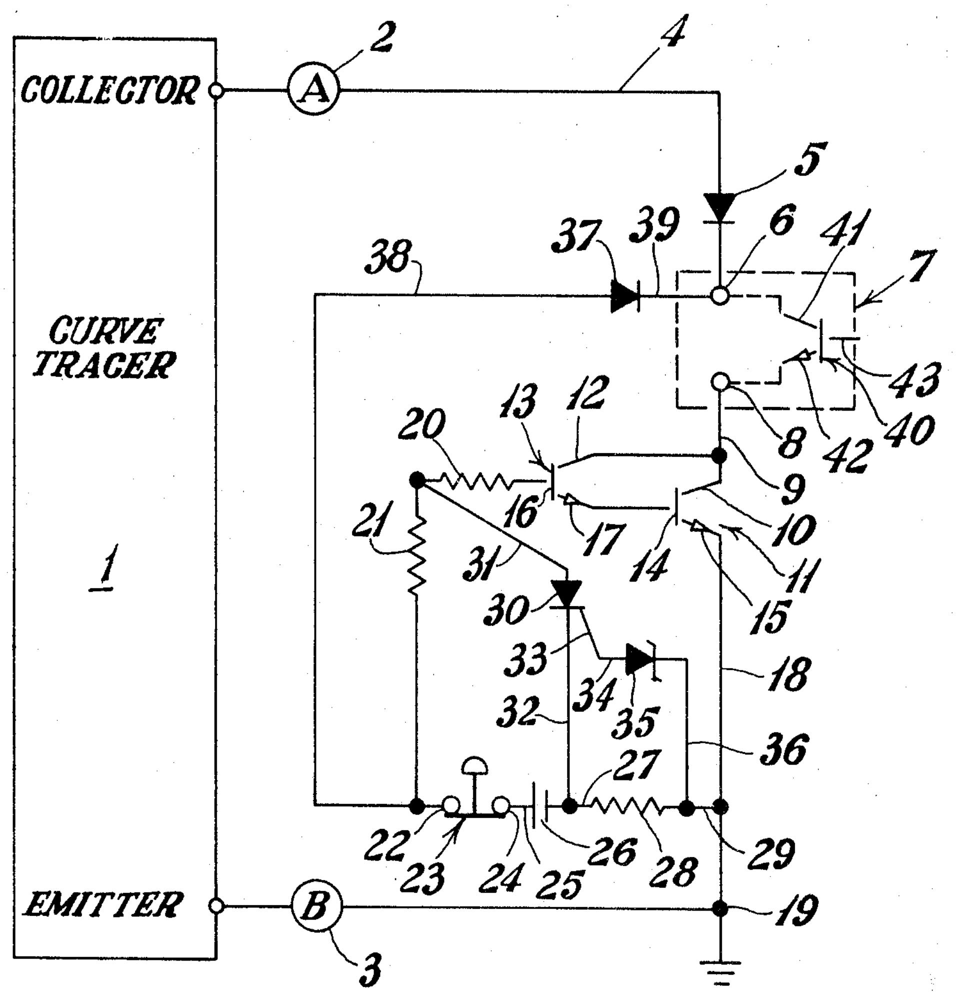
INVENTOR.
ROBERT W. BOLVIN
BY [signature]
ATTORNEY United States Patent Office 3,401,338
Patented Sept. 10, 1968

3,401,338

TESTER FOR SEMICONDUCTOR DEVICES HAVING A ZENER DIODE CONTROLLED BIAS REMOVAL PROTECTION CIRCUIT

Robert W. Bolvin, Wall, N.J., assignor to The Bendix Corporation, Eatontown, N.J., a corporation of Delaware Filed Apr. 11, 1966, Ser. No. 541,616
6 Claims. (Cl. 324—158)

ABSTRACT OF THE DISCLOSURE

A test circuit for determining breakdown voltage of a semiconductor device, utilizing a protection circuit including a silicon controlled rectifier responsive to the breakdown of a Zener diode. Upon the start of breakdown in the semiconductor device, the Zener diode breaks down and conduction is initiated in the silicon controlled rectifier to thereby shunt the biasing means and remove it from the semiconductor device before damage results by excess current burnout.

The present invention relates to semiconductor devices and more particularly to a circuit for testing such devices.

Heretofore in order to measure the open base ($V_{ceo}$) breakdown voltage of transistors a predetermined current limit was established. Inasmuch as the breakdown voltage of the devices varied, sometimes the predetermined current was too high resulting in damage to the devices. On other occasions the current was too low and no breakdown occurred.

The present invention provides a circuit in which a transistor can be driven to its second breakdown point without damage to the device.

It is an object of the present invention to provide an improved test circuit.

Another object of the invention is to provide improved means for measuring the second breakdown point of a transistor.

Another object of the invention is to provide novel means for testing transistors without the danger of applying excess currents.

The above and other objects and features of the invention will appear more fully hereinafter from a consideration of the following description taken in connection with the accompanying drawing wherein one example is illustrated by way of example.

In the drawing:

The single figure is a schematic diagram of a circuit embodying the invention.

Referring now to the drawing, a curve tracer 1 is shown, such for example a Tektronix 575, which has a collector terminal 2 and emitter terminal 3. The collector terminal 2 of the curve tracer 1 is connected by a conductor 4 and diode 5 to a terminal 6 of a test socket 7. The test socket 7 also has a terminal 8 which is connected by conductor 9 to collector 10 of a transistor 11. Also collector 12 of a transistor 13 is connected to the conductor 9. The transistor 11 has a base 14 and emitter 15. Likewise the transistor 13 has a base 16 and emitter 17. The base 14 of the transistor 11 is connected to the emitter 17 of the transistor 13 and the collector 10 and 12 are connected together in what is commonly known as the Darlington configuration.

The emitter 15 of the transistor 11 is connected by conductor 18 to the terminal 3 of the curve tracer. A ground connection 19 may be connected to the conductor 18. The base 16 of the transistor 13 is connected by resistor 20 and 21 to a terminal 22 of a switch 23. The switch 23 also has a terminal 24 which is connected by conductor 25 to one side of a source of current, for example a battery 26. The other side of the battery 26 is connected by conductor 27, resistor 28, and conductor 29 to the conductor 18.

A silicon controlled rectifier 30 has one side connected by conductor 31 to the midpoint between resistors 20 and 21. The other side of the rectifier 30 is connected by conductor 32 to the conductor 27. The rectifier 30 has a control electrode 33 which is connected by conductor 34 to one side of Zener diode 35. The other side of the diode 35 is connected by conductor 36, to the conductor 29. A diode 37 is connected by conductors 38 and 39 between the terminal 6 of the test socket 7 and the terminal 22 of the switch 23.

In operation a transistor 40 having collector 41, emitter 42, and base 43 is inserted in the test socket 7 with the collector 41 connected to the terminal 6 and the emitter to terminal 8. The diode 5 prevents current from the battery 26 from flowing through the curve tracer while the diode 37 blocks current from the curve tracer from flowing over the battery 26 and resistor 28. Transistors 11 and 13 are held in saturation by the current from the battery 26 across resistors 20, 21, and 28. The current through the resistor 28 does not provide a sufficient voltage drop to exceed the avalanche voltage of the Zener diode 30.

The voltage is increased until the second breakdown occurs in the transistor 40. As the voltage of the transistor 40 drops below the battery voltage, current flows through the diode 37, transistor 40, transistor 11, and resistor 28. This continues until the voltage drop across the resistor 28 is sufficient to overcome the hold off voltage of the Zener diode 35. This permits gate current to flow in the silicon controlled rectifier 30 to turn it on. Upon the rectifier 30 conducting, the base current for transistor 11 and 13 is turned off. The voltage previously seen across transistor 40 is now dropped across transistor 11. Current through the transistor 40 is removed. The current drop through the resistor 21 holds the rectifier 30 in a conducting state. The voltage of the curve tracer is then decreased to zero, the transistor 40 removed and the rectifier 30 returned to a nonconducting state.

Although only one embodiment of the invention has been illustrated and described, various changes in the form and relative arrangement of the parts, which will now appear to those skilled in the art, may be made without departing from the scope of the invention.

What is claimed is:

1. A test circuit for semiconductor devices comprising a test socket for receiving a transistor to be tested, circuit means including a transistor connected in series for connecting said test socket to a curve tracer, means normally biasing said transistor in a conducting state, other circuit means including a silicon controlled rectifier shunting said biasing means, and current responsive means including a Zener diode for turning on said silicon controlled rectifier to remove the bias from said transistor.

2. The combination as set forth in claim 1 and including a second transistor connected in a Darlington configuration with said first named transistor.

3. The combination as set forth in claim 1 and including blocking means for preventing current from said biasing means from flowing through said curve tracer.

4. The combination as set forth in claim 1 and including blocking means for preventing current from said curve tracer from flowing over said biasing means.

5. The combination as set forth in claim 1 in which said biasing means is a battery.

6. The combination as set forth in claim 1 in which said current responsive means includes a resistor connected across said Zener diode.

References Cited

UNITED STATES PATENTS

| | | | |
|---|---|---|---|
| 3,054,954 | 9/1962 | Boscia | 324—158 |
| 3,182,246 | 5/1965 | Lloyd | 317—33 XR |
| 3,218,542 | 11/1965 | Taylor. | |

RUDOLPH V. ROLINEC, *Primary Examiner.*

E. L. STOLARUN, *Assistant Examiner.*